United States Patent [19]

Koch

[11] Patent Number: 4,764,345
[45] Date of Patent: Aug. 16, 1988

[54] APPARATUS FOR THE DESULFURIZATION AND DETOXIFICATION OF FLUE GASES

[76] Inventor: Christian Koch, Muhlweg 13, 8570 Pegnitz, Fed. Rep. of Germany

[21] Appl. No.: 827,411

[22] Filed: Feb. 7, 1986

[30] Foreign Application Priority Data

Feb. 7, 1985 [DE] Fed. Rep. of Germany ....... 3504123

[51] Int. Cl.$^4$ ............................................. F01N 3/10
[52] U.S. Cl. ................................. 422/146; 422/145; 422/147; 422/173; 422/178
[58] Field of Search ............................ 422/171–173, 422/177, 212, 213, 215, 216, 219, 233, 223, 232, 146, 200, 204, 145, 147, 178

[56] References Cited

U.S. PATENT DOCUMENTS

| | | | |
|---|---|---|---|
| 1,233,569 | 7/1917 | Ellis | 422/219 |
| 2,418,679 | 4/1947 | Utterback | 422/216 |
| 2,419,508 | 4/1947 | Simpson et al. | 422/219 |
| 2,511,652 | 6/1950 | Shand | 422/223 |
| 2,882,912 | 4/1959 | Reeg et al. | 422/223 |
| 3,962,864 | 6/1976 | Williams et al. | 422/172 |
| 4,255,166 | 3/1981 | Gernand et al. | 422/216 |
| 4,297,321 | 10/1981 | Beranek | 422/145 |
| 4,617,175 | 10/1986 | Tolpin et al. | 422/171 |

Primary Examiner—Barry S. Richman
Assistant Examiner—Jill Johnston
Attorney, Agent, or Firm—Collard, Roe & Galgano

[57] ABSTRACT

An apparatus for purifying exhaust flue gases includes a reaction vessel having a lower crude flue gas inlet and an upper purified flue gas outlet. A reaction chamber, disposed inbetween the inlet and outlet is fillable with solid bodies capable of carrying a desulfurizing agent. A screw conveyor passes through the reaction chamber and has a top inlet end for introducing the solid bodies into the reaction chamber. A bottom vessel outlet end is provided for discharging reacted desulfurizing agent from the vessel. A process for purifying exhaust gas includes passing a migrating layer of solid bodies carrying a desulfurizing agent countercurrently to a flow of exhaust gas in a cleaning vessel. A temperature controlled zone, below the dew point temperature of the exhaust gas, is formed within the layer of solid bodies, thereby creating a stable washing zone within the layer of solid bodies, wherein the desulfurizing agent is converted into a conversion product by interaction with the gas, thereby cleaning the gas.

4 Claims, 5 Drawing Sheets

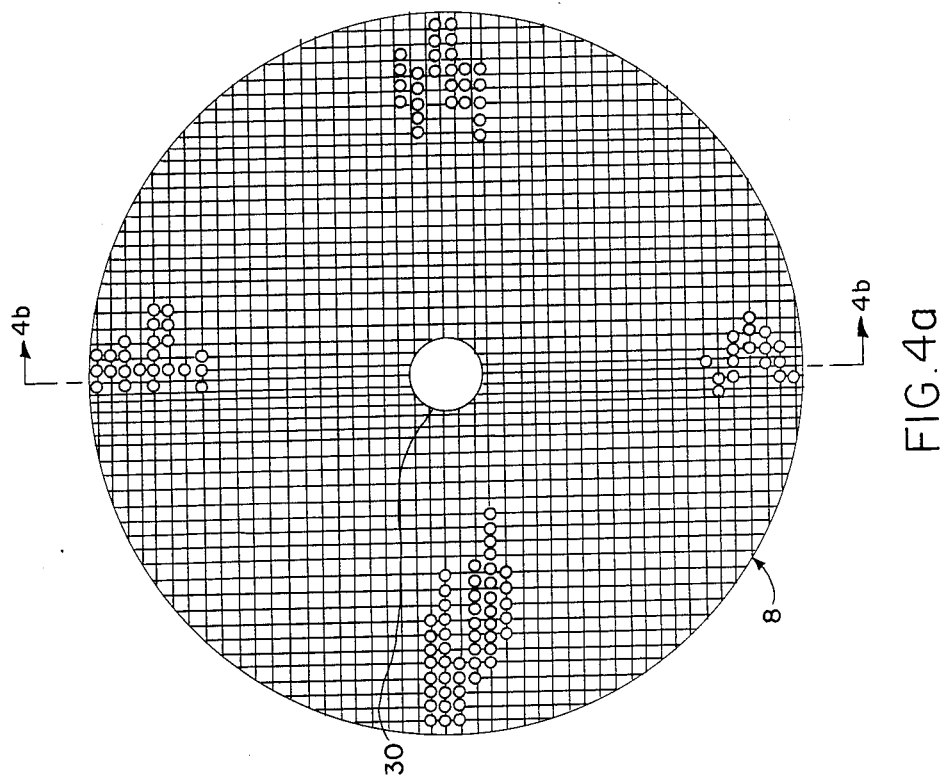
FIG. 4a
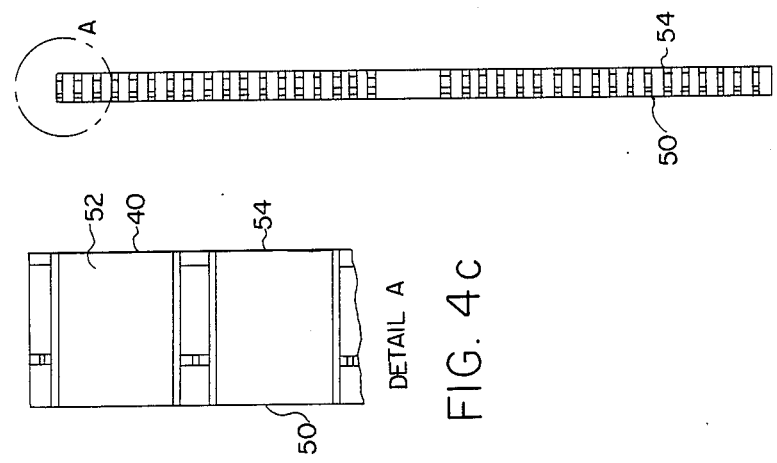
FIG. 4b
DETAIL A
FIG. 4c

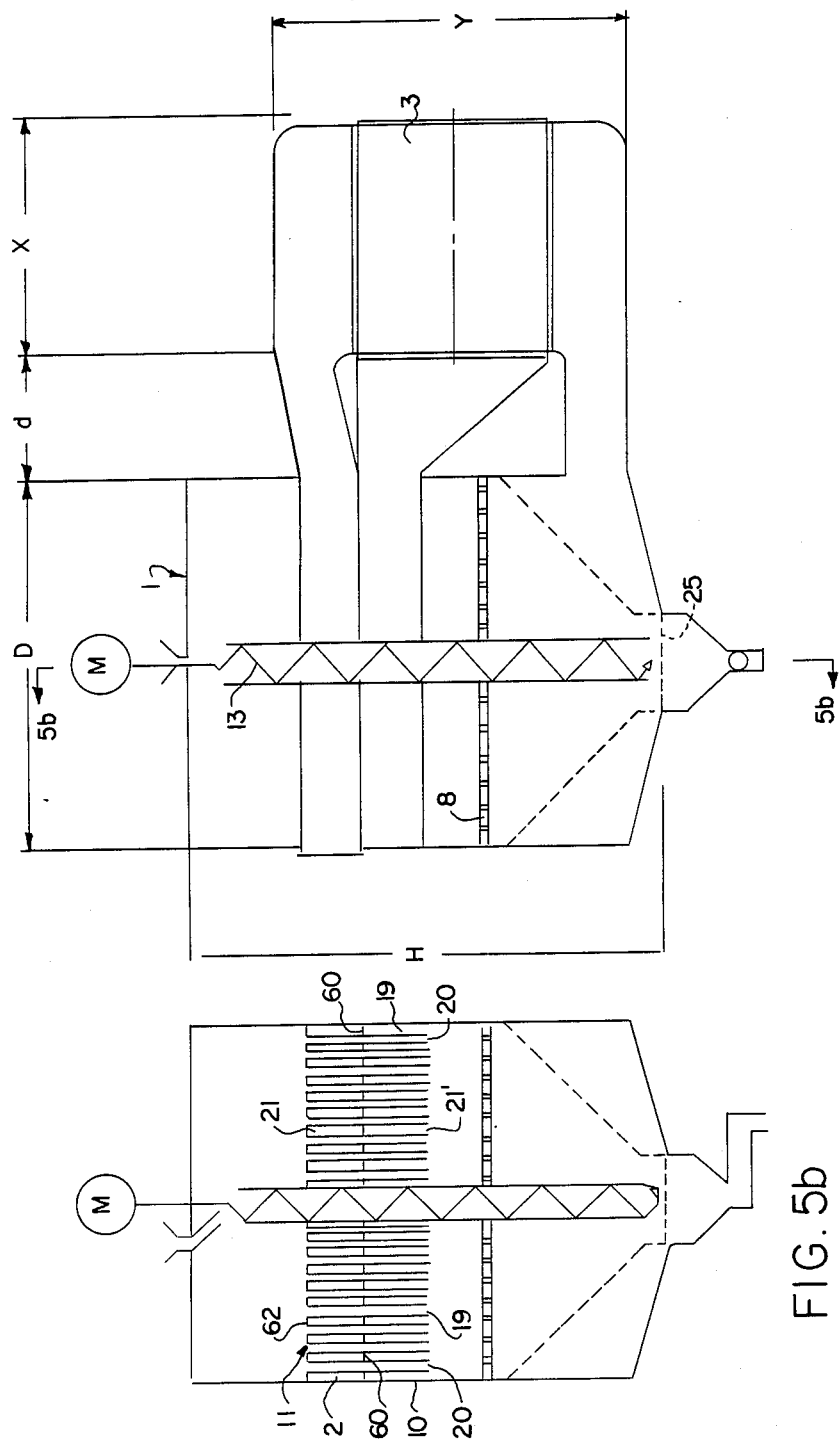

APPARATUS FOR THE DESULFURIZATION AND DETOXIFICATION OF FLUE GASES

BACKGROUND OF THE INVENTION

The invention relates to a process and apparatus for the detoxification of flue gases from furnaces and other industrial exhaust gas systems.

In furnaces, in addition to the carbon dioxide and water vapor combustion products, other products, which pose a special hazard to the environment, are liberated. Normally, these hazardous combustion products are removed from the exhaust gas by gas scrubbing procedures or dry additive processes with an addition of a desulfurizing agent.

The drawback of this method is that due to the small area of contact between the particles and the flue gas, an extensive construction height of the equipment is required. An improvement of this process has been proposed in German Patent Application P 33 40 655, which proposes a bulk heaping or pouring of spheres for the contacting of the mediums, instead of using a mist of droplets or dust. The drawback of this proposed system is that although a savings is achieved in the construction height of the equipment, a number of additional devices and systems, such as sphere removal and sphere washing equipment, lime milk treatment, and lime milk dosing or batching equipment, a detergent circuit and product treatment equipment, must be provided.

Accordingly, it is an object of the present invention to avoid the above drawbacks and to provide a simple and compact exhaust gas purification plant.

SUMMARY OF THE INVENTION

Certain of the foregoing and related objects are readily attained in a device for purifying exhaust gases in fillings of solid bodies or carriers with a crude gas inlet at the bottom or lower end of the vessel and a purified gas outlet at the top or upper end of the vessel. The vessel has a top attachment with an inlet for a desulfurizing agent, screw conveyor drive, outlet for discharging the solid bodies from the screw conveyor, a reaction vessel filled up to its top edge with solid bodies, a product vessel at the bottom end of the vessel, two dew point temperature measuring instruments, and a product washing device. Preferably a heat exchanger is preconnected in the crude gas stream upstream of the inlet leading to the reaction vessel, and the heat exchanger also has a connection to the purified gas. In addition, the screw conveyor may have a water connection for feeding water for cleaning the solid bodies. The heat exchanger most desirably is arranged in the desulfurization vessel above the exhaust gas discharge duct or zone, the heat exchanger drying and heating the washed, moist ceramic filling exiting at the top of the conveyor device. The heat exchanger may also have a downward extension of ceramic gaps forming the gas discharge zone. A wetting bottom or plate accommodating a flow of water is preferably arranged beneath the scrubbing zone for the desulfurization, the bottom having cylindrical passage openings in the downward direction and water outlet openings in the upward direction.

A process for the purification of flue gases purified countercurrently to a migrating layer of solid bodies includes forming a zone below the dew point of the flue gases within the layer of solid bodies, by water injection and/or heat exchange, with the zone being controlled by temperature sensors, therein creating a stable washing zone within the layer of solid bodies. Preferably, the desulfurizing agent is admixed with the solid bodies or carriers in the form of pieces of limestone, and the solid bodies are purified from the gas-agent reaction product by injecting water into the screw conveyor. An additional desulfurizing agent or lime milk or limestone milk may be added by admitting it at the top end into the screw conveyor. Most desirably the ceramic filling exiting from the screw conveyor is dried and heated in a heat exchanger having a flow of flue gas passing therethrough and the purified flue gas is discharged from the desulfurization vessel downstream of the extension plates of the heat exchanger. The flue gas may also be wetted and cooled for the desulfurization zone by the water exiting upwardly from the wetting bottom in such a way that a layer of reserve water remains available between the projecting tubes.

It has been found that if bulk solids are poured or heaped countercurrently to the flow or stream of flue gas, within the range of the dew point within the poured solids, a stable filled washing zone or scrubbing zone is formed which is especially efficient for the removal of harmful contaminants. In the present case, it suffices if a vessel is filled with limestone particles which discharge or release in the environment of the acid flue gas, the washing-active calcium hydrogen carbonate, which is converted into sulfite or gypsum by the sulfur-containing components of the flue gas.

Furthermore, surprisingly, it has been found that within the flue gas-heated top zone, the moist ceramic particles exiting from the conveyor screw can be dried by indirect heat exchange in such a way that the heated and dry ceramic particles filter out in the zone below, through which flue gas is streaming, and wherein liquid droplets discharge and preheat the flue gas. It has also been found that the water may be admitted for producing an absorption zone not only with nozzles supplied by conduits, but advantageously in a special wetting plate or wetting bottom.

Other objects and features of the present invention will become apparent from the following detailed description considered in connection with the accompanying drawings which disclose several embodiments of the invention. It is to be understood, however, that the drawings are designed as an illustration only and not as a definition of the limits of the invention.

BRIEF DESCRIPTION OF THE DRAWINGS

In the drawings, wherein similar reference characters denote similar elements throughout the several views:

FIGS. 2b and 2c are schemmatical cross-sectional views of the heat exchanger shown in FIG. 2a;

FIG. 3b is a side sectional view thereof taken along line 3b—3b of FIG. 3a;

FIG. 4a is a schemmatical top view of the wetting plate of the apparatus shown in FIG. 1;

FIG. 4b is a side sectional view taken along line 4b—4b of FIG. 4a;

FIG. 4c is an enlarged view of detail A shown in FIG. 4b.

FIG. 5a is a schemmatical side view of the apparatus without the circulating ceramic bodies; and FIG. 5b is a schemmatical section view thereof taken along line 5b—5b of FIG. 5a.

Turning now in detail to the appended drawings, therein illustrated is a novel apparatus for the desulfurization and detoxification of flue gases which, as shown in FIG. 1 includes a desulfurization vessel 1 containing a ceramic carrier drying zone 2, through which the unpurified flue gas 31 passes. (Zone 2 is shown in greater detail in FIG. 5a.) After passing through zone 2 with relatively little cooling, the unpurified flue gas 31 subsequently passes through the cross-flow heat exchanger 3 and the cross-flowing desulfurized flue gas 32 is correspondingly reheated in heat exchanger 3, in which process the unpurified flue gas 31 is cooled further (see FIG. 2a). FIG. 2a discloses the cross flow heat exhanger 3 which has rows of horizontally running passageways 36 alternating with rows of vertically running passageways 38 and is illustrated in FIG. 2b. FIG. 2c is a partial cross-sectional view of FIG. 2b along the lines C—C. Via the conduit 4, the now precooled flue gas 34 enters the bottom flue gas distribution chamber 5. Via the perforated plate 6, the flue gas then enters and contacts the ceramic filling 7, where the dry layer of gypsum forms by drying on the surface of the ceramic carriers or filling which further cools the flue gas. The flue gas so cooled passes through the wetting assembly or plate 8, shown best in FIG. 4a, and enters the actual scrubbing zone 9.

Figure 1:
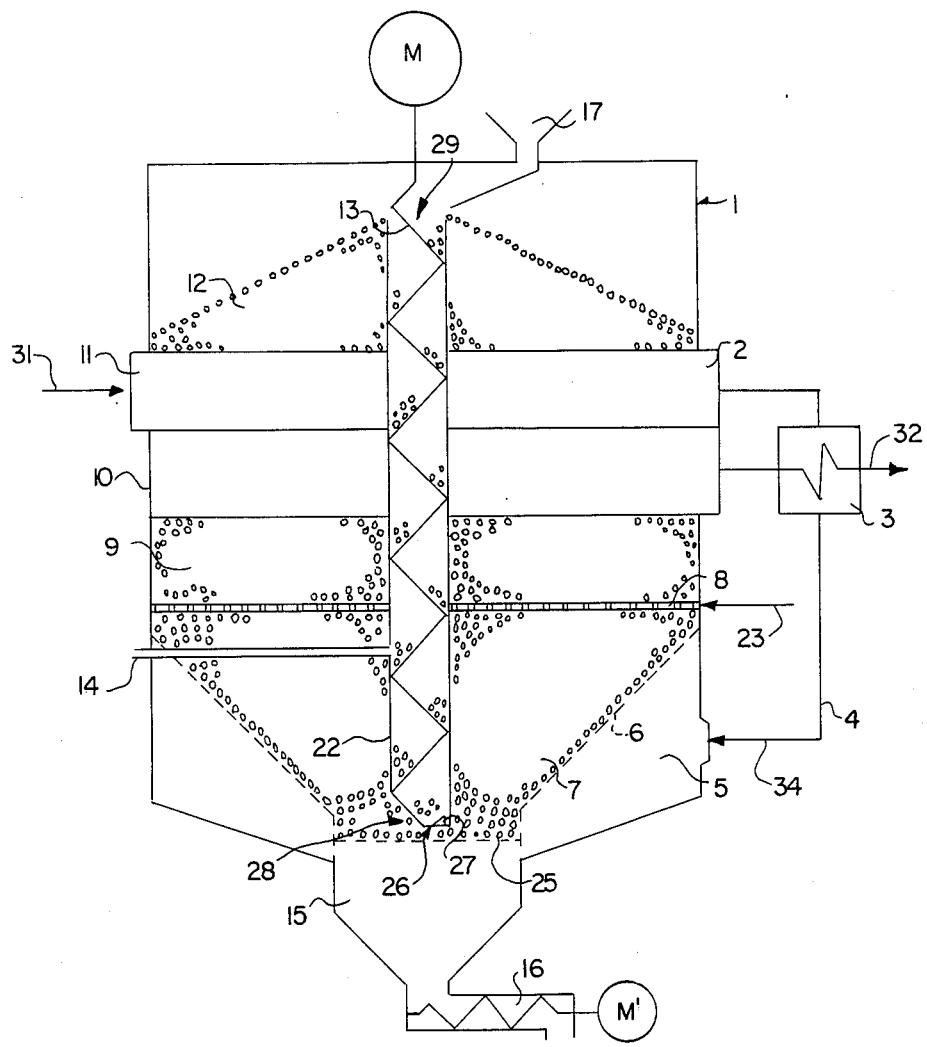
FIG. 1 is a schemmatical side view of the apparatus embodying the present invention.

In scrubbing or desulfurization zone 9, an amount of water sufficient to maintain the desulfurization temperature within a defined temperature interval exits from wetting plate or assembly 8 up into the desulfurization bed in zone 9. The ceramic filling enters the desulfurization zone 9 from above having a proportion of from 0.5 to 10% limestone, which causes the following reactions to occur in moist desulfurization zone 9:

i.e., dissolution of the limestone in the liquid;

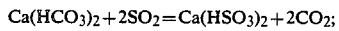

i.e., absorption or chemical reaction;

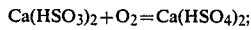

i.e., oxidation of the product in the acid state;

i.e., formation of gypsum.

The final product, i.e., gypsum, precipitates from the liquid and forms the coating, which dries out in the lowermost ceramic layer of the ceramic filling zone 7, forming a solid coating of gypsum. Before entering the flue gas separation zone 10, in the uppermost layer of the desulfurization zone 9, the purified flue gas is dried and filtered by the dry and warm ceramic layer present therein. Flue gas separation zone 10 is provided as a continuation of the ceramic carrier heat exchanger 11. However, zone 10, having plates with openings facing the lower end of the apparatus, conducts the dried ceramic material and separates it from the flue gases.

Figure 3A:
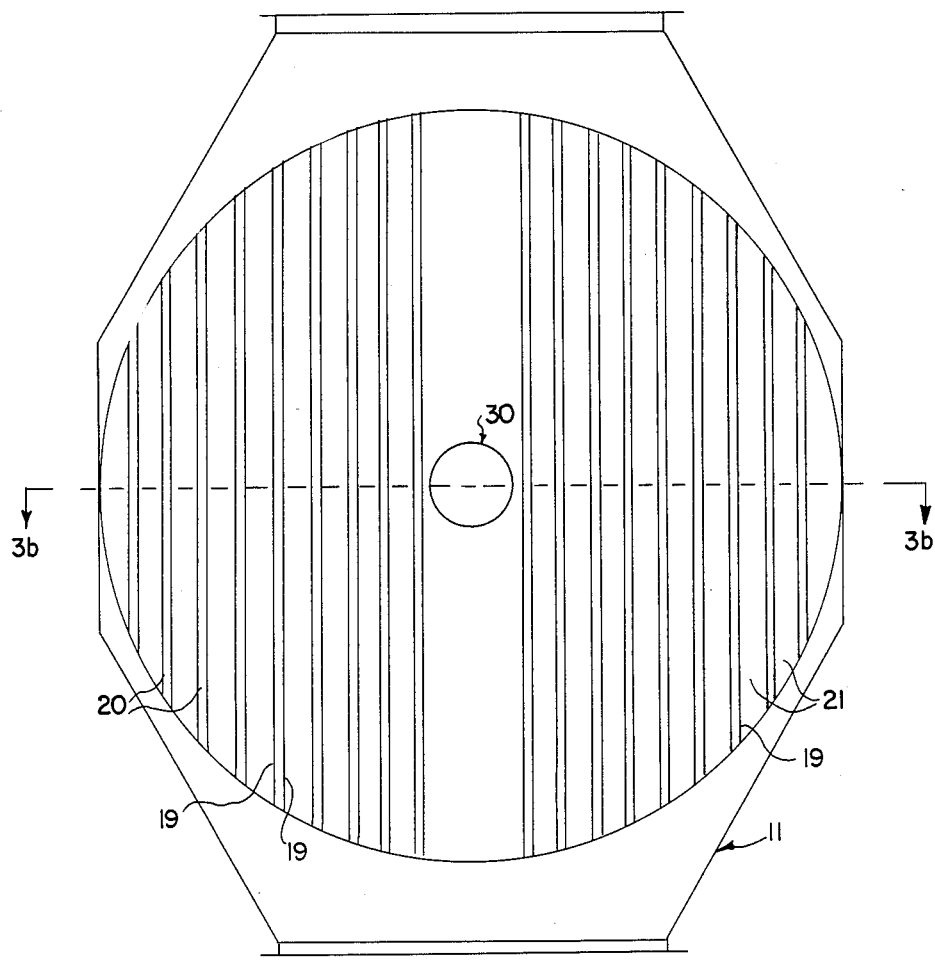
FIG. 3a is a schemmatical top view of the ceramic heat exchanger of the apparatus shown in FIG. 1.
Figure 3B:
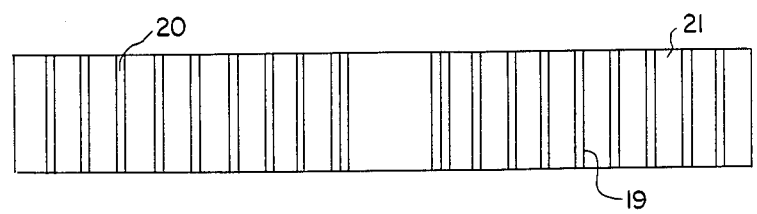

Ceramic carrier heat exchanger 11, which is shown in FIG. 3a, conducts the flue gases through a series of vertically oriented plates 19 which define the side walls of openings 20 and 21, which plates extend upwardly from zone 10. The plates 19 forming openings 20 are by the bed of ceramic bodies or carriers. The ceramic carriers, which are dried and heated in the heat exchanger, are disposed in the narrow slots or openings 20, whereas the unpurified, hot exhaust gas passes upwardly through the heat exchanger through the wider slots or openings 21. In this process, the ceramic carriers disposed in the supply or reservoir zone 12 dry and warm up while passing downwardly through heat exchanger 11. Openings 21' extend through zone 10 and 11 so that the ceramic carrier may pass from zone 12 to zone 9 while drying. FIG. 5b shows a plate 60 which extends between zones 10 and 11 to prevent intermixing of the purified gas (zone 10) and unpurified gas (zone 11). Flow of purified flue gas into zone 12 through openings 20 is effectively prevented by the ceramic carrier therein and the relative low pressure path to heat exchanger 3 through openings 21 in zone 10.

In zone 11, plates 62 seal the tops of openings 21 to prevent untreated flue gas from entering zone 12. Therefore, unpurified flue gas flows through the openings of channels 21 into heat exchanger 3. Openings 20 in zone 11 are isolated from opening 21 therein so that there is no direct contact between the crude flue gas and the ceramic bodies.

The bottom of openings 21 in zone 10 are not sealed since purified flue gas 32 is captured from the center bed in zone 9. Openings 21 in zone 10 again conduct the cooled purified gas to heat exchanger 3.

The ceramic carriers are transported by the conveyor screw 13 operated by motor M, which continuously picks up the gypsum-coated ceramic carriers or bodies in the space between the conveyor screw and the sleeve tube 22, transporting the bodies to the head or top 29 of the apparatus. In their course of upward travel on screw 13, the ceramic bodies go through a washing process accomplished by feeding the washing water via a conduit 14 into the lower part of the screw 13. This washing water, because of the low pH or acid reaction of the coating, completely removes the gypsum coating without scrubbing. The coating so removed and the washing water jointly form a gypsum slurry which is collected in the separation vessel or zone 15, from where the slurry exits the vessel 1 via the discharge conveyor screw 16 powered by motor M'.

The admission of the desulfurizing agent has to be in conformity with the gypsum discharge. The desulfurizing agent is admitted via the inlet 17, for example, by means of a bucket wheel. Here, limestone is added in an amount ranging from 0.5% to 10% of the circulation of the ceramic carrier filling and on the concentration and amount of flue gas components to be desulfurized.

The wetting assembly or plate 8, which is shown in FIG. 1, is supplied with water at a controlled temperature via a water conduit 23. This water moves towards the top of assembly 8 and into the spaces disposed between the multiplicity of passageway bores or cylinders 52 (see FIG. 4c). These spaces are formed by the projection of the cylinders 52 though assembly 8 between bottom plate 50 and top plate 54. The water, forming a supernatant layer above the upper edge 40 (see FIG. 4c) of the cylinder 52, cannot flow downwardly against the flow or stream of flue gas passing upwardly through the cylinders, and is carried into zone 9 from plate 8 by the flue gas. In this process, the flue gas is cooled to a temperature below the cooling limit temperature. In this way, a washing or scrubbing zone is formed above the wetting plate 8, and the above-described chemical reactions take place in the scrubbing zone or layer of desulfurization zone 9.

Especially suitable ceramic bodies are cylindrical rings because they have the best transport capability in the conveyor screw and create the lowest loss of pressure through the vessel, in comparison with other carriers. With respect to transport capability, spheres would also be suitable. However, spheres cause a significantly higher loss of pressure. Furthermore, spheres are less efficient in terms of screw conveying. In comparison to cylindrical rings, a significantly lower number of spheres are conveyed due to the fact that no wall friction is caused with tube 22 enclosing the screw in the conveyance of cylindrical rings.

Problems with the transport of the ceramic carriers are solved, according to the invention, by the combination of conveyor screw 13 and installed equipment. Conveyor screw 13 with its sleeve-like tube 22 is an important supporting element for the installed equipment. The conveyor screw, via its rotary motion, supplies the vibrations required for maintaining the transport of the ceramic carrier filling. Sleeve-like tube 22 surrounding screw 13 is supported by the interior of ceramic carrier heat exchanger 11 as it passes through bore 30 therein, as shown in FIG. 3a. Tube 22 rests on the separating perforated bottom plate 25 between layer or zones 7 and 15. Sleeve-like tube 22, at its bottom end, has breakthroughs or openings providing access to screw 13, disposed therein which, within its infeed zone 26, has wedges 27 mounted on the outer edge of the screw spiral. Wedges 27 cause the ceramic carriers to first drop into the inner zone of the screw spiral 13 before reaching the region above the infeed slots. In this way, crushing or shearing of the ceramic carriers between the spiral of screw 13 and the edges of the inlet openings is prevented.

Conveyor screw 13 is fastened only on the cover of desulfurization vessel 1 by means of bearings, so that it may be removed therefrom, without dismantling other parts of the equipment, by pulling it from vessel 1 in the upward direction.

FIGS. 5a and 5b show the total arrangement without the circulating ceramic carriers, and illustrates the arrangement of heat exchanger 11 in the path of the flue gas and the design of zones 10 and 11, in which the ceramic carriers are dried and the flue gas is separated. As shown in FIG. 1, the apparatus according to the invention includes a cylindrical vessel 1, in which are arranged separating perforated bottom plate 25, wetting plate 8, ceramic heat exchanger 11 for the ceramic carriers, with its sheet metal plates or extensions, and screw conveyor 13. The washing water feed conduit 14, separator vessel 15, the discharge screw conveyor 16 for conveying the gypsum slurry, the desulfurizing agent or limestone gravel inlet 17, as well as flue gas conduit 4, which crosses or feeds through heat exchanger 3, are connected to or mounted on vessel 1.

The invention will now be explained more fully in a number of examples which are, however, only given by way of illustration and not of limitation.

EXAMPLE I

Exhaust gas from a heavy oil combustion plant is to be desulfurized at a rate of about 15,000 m$^3$/h of exhaust gas.

With reference to FIG. 1, the exhaust gas, which is unpurified and has a temperature in the range of 160° to 210° C., passes through ceramic carrier heat exchanger 11, and is cooled in this course by about 5° to 20° C. The dissipated heat dries the clean but moist ceramic carriers, while heating them to temperatures of from 10° to 30° C. below the temperature of the exhaust gas. Depending on the rate of circulation of the ceramic bodies or carriers via screw conveyor 13, the mixture will dwell in the plate heat exchanger 11 for 15 to 45 minutes. The rate of circulation of the ceramic bodies by conveyor 13 is adjusted in such a way that following the addition of limestone, the filling has a ratio of limestone to ceramic carriers of from 0.05 to 0.1 in supply zone 12.

With a sulfur content of 2% in the heavy heating oil, the $SO_2$-concentration in the combustion exhaust gases comes to 1100 ppm or 2860 mg/m$^3$, with 5% excess air in the combustion process. Consequently, based on an amount of exhaust to be desulfurized at a rate of 15,000 m$^3$/h, the amount of limestone added in particulate form via a bucket wheel comes to about 70 kg limestone/hour, and the rate of circulation of the ceramic filling comes to about 1500 kg/h.

After passing through ceramic carrier heat exchanger 11, the still-unpurified exhaust gas arrives in heavy-duty heat exchanger 3 at a temperature ranging from 140° to 190° C. In heat exchanger 3, the exhaust gas is cooled further to from 80° to 120° C., and the liberated heat is transferred to the purified exhaust gas, which has a temperature in the range of 60° to 80° C. The purified exhaust gas is heated in this course to from 110° to 140° C., so that it may be passed into the smoke stack without the hazard of condensation.

On exiting from heavy-duty heat exchanger 3, the unpurified exhaust gas passes into the bottom part of desulfurization vessel 1, i.e., bottom flue gas distribution chamber 5 via duct 4. Chamber 5 conducts the gas through perforated plate 6 into the lower part of the ceramic carrier filling zone 7, which is provided with a fine coating of gypsum. In layer 7, after-drying of the layer of gypsum takes place while the gas is streaming in the upward direction.

After passing wetting plate 8, the sulfur-containing exhaust gas comes into contact with the moist ceramic carriers and the moist limestone gravel in zone 9. Desulfurization as well as cooling of the gas to a temperature below the cooling limit temperature due to water absorption and water saturation take place in the bottom part of zone 9 via the aforesaid chain of reactions. Depending on how the equipment is operated and the composition of the heavy oil, the flue gas absorbs water at a rate of 500 to 800 liters/h, and it is cooled in this process to from 45° to 60° C. In the top part of scrubbing zone 9, the clean, cooled, and saturated exhaust gas passes through a dry ceramic carrier layer, which has been heated while passing through ceramic carrier heat exchanger 11, to from 130° to 180° C. In passing through this dry layer, the exhaust gas is heated to from 60° to 80° C. before collecting in the collection spaces 21 of gas separating zone 10. From zone 10, the exhaust gas passes through the heavy-duty heat exchanger 3, from which it exits, with a temperature in the range of 110° to 140° C., into a smokestack (see FIG. 1).

Continuing its downward movement, the dry ceramic carrier filling having a temperature of from 70° to 90° C. slides across the perforated plate 6 into the base 28 of the cone-shaped zone 7 where it is picked up by screw conveyor 13 and transported back to the head 29 of the vessel. The gypsum, which has formed on the ceramic carriers in the form of a fine coating at a rate of about 90 kg/h, is removed with washing water and withdrawn via a separating funnel or vessel 15 and the gypsum slurry discharge screw conveyor 16.

EXAMPLE II

Figure 2A:
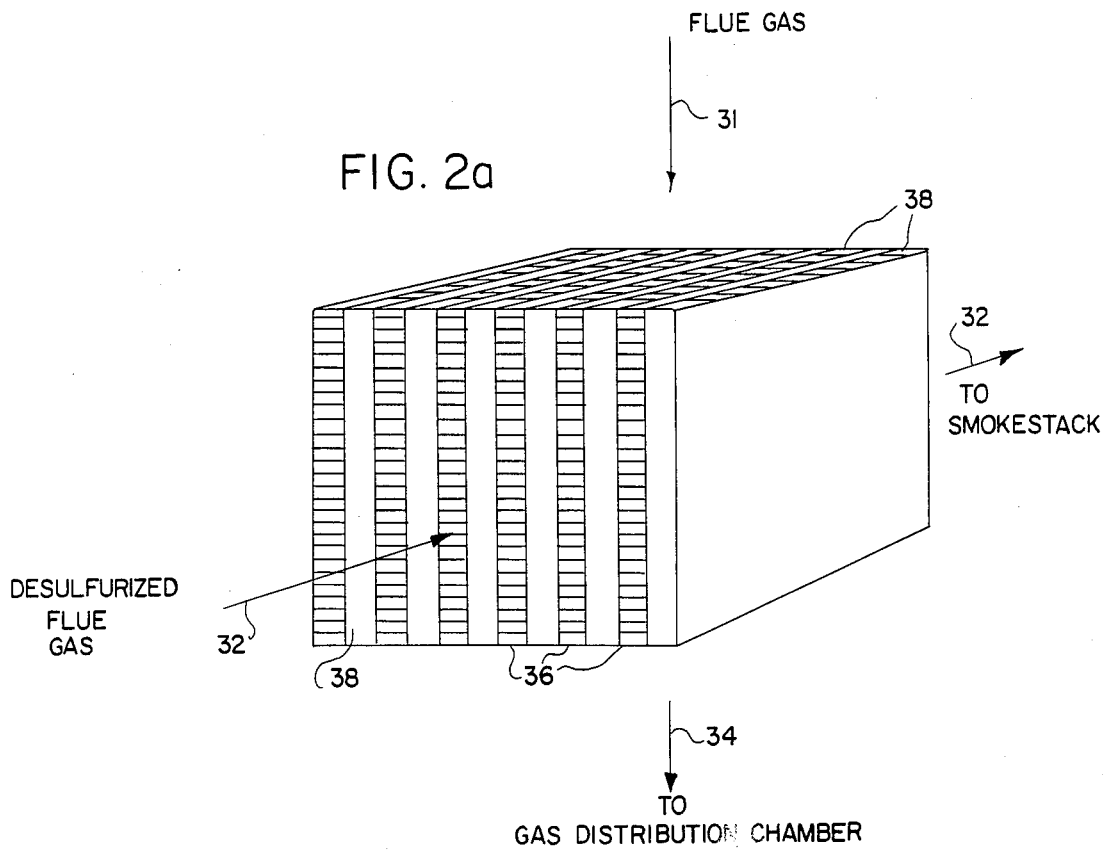
FIG. 2a is a schemmatical perspective view of the cross-flow heat exchanger of the apparatus shown in FIG. 1.
Figure 2B:
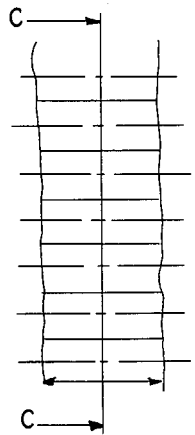
Figure 2C:
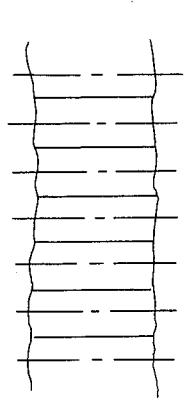

An amount of 15,000 m³/h of exhaust gas passes through a plate heat exchanger 11 (see FIG. 3a) having a diameter of 3000 mm and 19 free or unobstructed flow cross sections sized 450×95 mm, and from there into a heavy-duty heat exchanger 3, shown in detail in FIG. 2a, with the outside dimensions of 1.8×1.8×1.6 m. Heat exchanger 3 is designed as a ribbed or fin heat exchanger for crosswise flow. The gas emerges from heat exchanger 3 and passes into base 28 of desulfurization vessel 1, which has a height of about 4 meters and a diameter of about 3 meters, and from there passes into an annular separating vessel or distribution zone 15 which, at its top side, is bounded by a perforated plate 25 provided with 6 mm diameter holes. After passing through perforated plate 25, the gas passes through a layer of carriers of about 0.75 m thickness before reaching wetting plate 8, which has a diameter of about 3 meters and is provided with holes having a diameter of 100 mm; the edges of these holes project above the plate by about 20 mm. Between the plates 50, 54, water reaches the spaces between the elevated edges of the holes by way of 4 mm diameter holes provided at the top side of assembly 8. In this way, the water is evenly distributed, assuring wetting across the total cross-sectional area.

A ceramic carrier filling of about 500 mm thickness is disposed above wetting plate 8, and adjoins the plates of zone 10 which collect the gas and are disposed above the filling. The space for collecting the gas is formed by extending slots of 50 mm width by 500 mm, through which slots the ceramic carriers and the limestone gravel slide past the plate heat exchanger (see FIG. 5b). The gas collects in the 19 spaces or openings 21 in zone 10, which are 500 mm high and 95 mm wide, and exits from desulfurization vessel 1 in the direction of heavy-duty heat exchanger 3.

From base 28 of desulfurization vessel 1, the ceramic bodies are returned to head 29 by means of a screw conveyor 13 having a diameter of about 300 mm. The gypsum slurry collects in a separating vessel 15 having a diameter of 1100 mm, and it is discharged from this vessel by way of discharging screw conveyor 16. The separating vessel is sealed against the outside atmosphere by means of a controlled filling level.

FIG. 5a shows the desulfurization system with the primary dimensions for this specific embodiment. The diameter D of desulfurization vessel 1 is about 3000 mm, and the height H of the vessel comes to about 4000 mm. The heavy-duty heat exchanger 3 shown in FIG. 2a is arranged with a depth d of about 1000 mm, and its dimensions correspond with the duct dimensions X of 2000 mm and Y of 3000 mm.

While several embodiments and examples of the present invention have been shown and described, it will be obvious that many changes and modifications may be made thereunto without departing from the spirit and scope of the invention.

What is claimed is:

1. An apparatus for purifying exhaust flue gases comprising:
   a reaction vessel having a top and bottom, said reaction vessel comprising:
   a lower inlet for crude flue gases;
   an outlet at the bottom of said vessel for reacted desulfurizing agent;
   an upper outlet for purified flue gas;
   a reaction chamber, fillable with solid bodies capable of carrying a desulfurizing agent, disposed between said lower flue gas inlet and said upper purified flue gas outlet;
   means for introducing lime into said reaction vessel through the top thereof;
   a screw conveyor passing through said reaction chamber, said conveyor having a lower inlet end below said reaction chamber and an upper outlet end above said reaction chamber for circulating solid bodies in said reaction chamber;
   a means for introducing water into said screw conveyor for cleaning solid bodies in said reaction chamber;
   a means for discharging reacted desulfurizing agent cleaned from solid bodies in said reaction chamber from said bottom vessel outlet of said reaction vessel; and
   a heat exchanger arranged in the reaction vessel above said lower inlet for crude flue gases and below the upper outlet end of said screw conveyor, said heat exchanger having a first side thereof for receiving said crude flue gases prior to entry of said crude flue gases into said lower inlet of said reaction vessel, said heat exchanger having a second side thereof capable of drying and heating washed, moist solid bodies exiting from the outlet of said screw conveyor.

2. The apparatus according to claim 1, further comprising a second heat exchanger in fluid communication with and located between said heat exchanger and the lower inlet leading to the reaction vessel, said second heat exchanger having one side connected to a crude gas stream exiting said heat exchanger and having one side thereof connected to the purified gas after it exits from said upper outlet of said reaction vessel.

3. The apparatus according to claim 1, wherein said heat exchanger has downwardly extending plates alternately forming said first and second sides of said heat exchanger for the flow of said crude flue gases and solid bodies, respectively.

4. The apparatus according to claim 1, further comprising a scrubbing zone located below said heat exchanger for the desulfurization of a crude flue gases within said reaction chamber, a plate accommodating a flow of water, said plate arranged beneath said scrubbing zone for the desulfurization and above said lower inlet for crude flue gases, said plate having openings which allow water to move upwardly therethrough and form a supernatant layer above an upper edge thereof.

* * * * *